United States Patent [19]
Saeva et al.

[11] 3,780,307
[45] Dec. 18, 1973

[54] LIQUID CRYSTALLINE COMPOSITIONS HAVING INDUCED OPTICAL ACTIVITY

[75] Inventors: Franklin D. Saeva, Fairport; Joseph J. Wysocki, Webster, both of N.Y.

[73] Assignee: Xerox Corporation, Stamford, Conn.

[22] Filed: Oct. 22, 1971

[21] Appl. No.: 191,671

[52] U.S. Cl. ............... 250/484, 250/339, 250/474, 250/487, 350/150
[51] Int. Cl. ............... G02f 1/26
[58] Field of Search ............... 250/83.3 IR, 484, 250/339, 474, 487; 350/150, 160 LC

[56] References Cited
UNITED STATES PATENTS

| | | | |
|---|---|---|---|
| 3,597,044 | 8/1971 | Castellano | 350/160 |
| 3,627,699 | 12/1971 | Goldberg | 252/408 |
| 3,364,433 | 1/1968 | Freund et al. | 330/4.6 |
| 3,622,224 | 11/1971 | Wysocki | 350/150 |

OTHER PUBLICATIONS

"Cholesteric Liquid Crystals For Optical Applications" by Kahn, Applied Physics Letters, Vol. 18, No. 6, 3/15/77, pp. 231–233.

"Liquid Crystals And Their Applications," Electro–Technology, January 1970, page 48.

Primary Examiner—Harold A. Dixon
Attorney—James J. Ralabate et al.

[57] ABSTRACT

The electronic transitions of extrinsically optically inactive materials become circularly dichroic when these materials are introduced into an optically negative liquid crystalline environment thereby providing unusual and highly advantageous properties in such compositions. The circularly dichroic optical properties induced in the normally extrinsically optically inactive materials can be utilized for imaging, optical filter and other related applications.

8 Claims, 7 Drawing Figures

LIQUID CRYSTALLINE COMPOSITIONS HAVING INDUCED OPTICAL ACTIVITY

BACKGROUND OF THE INVENTION

This invention relates to liquid crystalline materials and more specifically to uses of compositions comprising optically negative liquid crystalline materials and extrinsically optically inactive materials which become optically active when placed in an optically negative liquid crystalline environment.

Liquid crystalline substances exhibit physical characteristics some of which are typically associated with liquids and others which are typically unique to solid crystals. The name "liquid crystals" has become generic to substances exhibiting these dual properties. Liquid crystals are known to appear in three different forms: the smectic, nematic and cholesteric forms. These structural forms are sometimes referred to as mesophases thereby indicating that they are states of matter intermediate between the liquid and crystalline states. The three mesophase forms of liquid crystals mentioned above are characterized by different physical structures wherein the molecules of the compound are arranged in a manner which is unique to each of the three mesomorphic structures. Each of these three structures is well known in the liquid crystal art.

Some liquid crystalline substances possess optically negative characteristics. Birefringence, also referred to as double refraction, is an optical phenomenon characteristic of some solid crystals and most liquid crystal substances. When a beam of unpolarized light strikes a birefringent substance it is split into two polarized components whose transverse vibrations are at right angles to each other. The two components are transmitted at different velocities through the substance and emerge as beams of polarized light. By the term "liquid crystalline substances which have optically negative characteristics", as used herein, is meant those for which the extraordinary index of refraction $\nu_E$ is smaller than the ordinary index of refraction $\nu_o$. Cholesteric liquid crystal substances exhibit this property. For a detailed description of this phenomenon see *Optical Crystallography*, Wahlstrom, 4th Edition, Wiley and Sons, Inc., New York.

The molecules in cholesteric liquid crystals are arranged in very thin layers with the long axes of the molecules parallel to each other and to the plane of the layers within each layer. Because of the asymmetry and steric nature of the molecules the direction of the long axes of the molecules in each layer is displaced slightly from the corresponding direction in adjacent layers. This displacement is cumulative over successive layers so that overall displacement traces out a helical path. A comprehensive description of the structure of cholesteric liquid crystals is given in *Molecular Structure and the Properties of Liquid Crystals*, G. W. Gray, Academic Press 1962.

Cholesteric liquid crystals have the property that when the propagation direction of plane polarized or unpolarized light is along the helical axis thereof, i.e., when the light enters in a direction perpendicular to the long axes of the molecules, (neglecting absorption considerations), this light is essentially unaffected in transmission through thin films of such liquid crystals except for a wavelength band centered about some wavelength $\lambda_o$ where $\lambda_0 = 2np$ with $n$ representing the index of refraction of the liquid crystal substance and $p$ the pitch or repetition distance of the helical structure. The bandwidth $\Delta \lambda_o$ of this wavelength band centered about $\lambda_o$ will typically be of the order of about $\lambda_o/14$. For light of a wavelength $\lambda_0$, the cholesteric liquid crystal, under these conditions, exhibits selective reflection of the light such that approximately 50 percent of the light is reflected and approximately 50 percent is transmitted, assuming negligible absorption which is usually the case, with both the reflected and transmitted beams being approximately circularly polarized in opposite directions.

For light having wavelengths around $\lambda_o$ but not at $\lambda_o$ the same effect is present but not as pronounced. The transmitted light is not circularly polarized but is instead elliptically polarized. The cholesteric liquid crystals which exhibit this property of selective reflection of light in a region centered around some wavelength $\lambda_o$ are said to be in the Grandjean or "disturbed" texture. If $\lambda_o$ is in the visible region of the spectrum the liquid crystalline film appears to have the color corresponding to $\lambda_o$ and if $\lambda_o$ is outside the visible spectral region the film appears colorless.

Depending upon the intrinsic rotary sense of the helix, i.e., whether it is right-handed or left-handed, the light that is transmitted in the region about $\lambda_o$ is either right-hand circularly polarized light (RHCPL) or left hand circularly polarized light (LHCPL). The transmitted light is circularly polarized with the same sense of polarization as that intrinsic to the helix. Thus, a cholesteric liquid crystal having an intrinsic helical structure which is left-handed in sense will transmit LHPCL and one having a helical structure which is right-handed in sense will transmit RHCPL.

Hereinafter these cholesteric liquid crystal substances will be identified in order to conform with popular convention, by the kind of light which is reflected at $\lambda_o$. When a film is said to be right-handed, it is meant that it reflects RHCPL, and when a film is said to be left-handed, it is meant that it reflects LHCPL.

A right-handed cholesteric liquid crystal substance transmits LHCPL essentially completely at $\lambda_o$ whereas the same substance reflects almost completely RHCPL. Conversely a left-handed film is almost transparent to RHCPL at $\lambda_o$ and reflects LHCPL. Since plane polarized or unpolarized light contain equal amounts of RHCPL and LHCPL, a cholesteric liquid crystal film is approximately 50 percent transmitting at $\lambda_o$ for these sources when the liquid crystal is in its Grandjean texture.

A further unique optical property of optically negative liquid crystal films is that contrary to the normal situation when light is reflected, such as by a mirror, where the sense of the circular polarization of the reflected light is reversed, this same phenomenon does not occur with light reflected by these liquid crystal films. The sense of the circular polarization of light reflected from these liquid crystal substances is not reversed but rather remains the same as it was before it came into contact with the liquid crystal substance. For example, if RHCPL having a wavelength $\lambda_o$ is directed at a right-hand film having $\lambda_o = 2np$ it is substantially completely reflected and, after reflection, remains RHCPL. If the same light were to be directed on a mirror the reflected light would be LHCPL.

Because of these optical properties optically negative liquid crystalline substances have been found to be highly advantageous for use in a number of applications. Copending patent applications Ser. No. 104,367 now U.S. Pat. No. 3,669,525 and Ser. No. 104,369 now U.S. Pat. No. 3,679,270, both filed Jan. 6, 1971 disclose the use of such liquid crystalline materials in optical filter systems. Copending patent application Ser. No. 104,344, filed Jan. 6, 1971, discloses the use of these materials in a detection system which can identify physical surface and/or electrical conductivity irregularities in a surface of interest.

It is known that the pitch of cholesteric liquid crystalline substances is responsive to various foreign stimuli such as heat, pressure, electric fields, magnetic fields, etc. In some cases this characteristic is a highly desirable advantage such as where the substance is used in a detection system to indicate the presence, or a change in the amount present, of any particular stimulus. However according to some uses of these substances the fact that their performance is affected by foreign stimuli is not an advantage and it would be desirable to have materials whose performance in a particular mode would be essentially independent of the presence of the above-mentioned stimuli.

In rapidly growing areas of technology such as liquid crystals new methods, apparatus, compositions and articles of manufacture are often discovered for the application of the new technology in a new mode. The present invention relates to novel and advantageous uses of optically negative liquid crystalline compositions.

SUMMARY OF THE INVENTION

It is, therefore, an object of this invention to provide an optical system having the above-mentioned desirable features.

A further object of the invention is to provide novel liquid crystalline compositions having a cholesteric mesophase.

It is another object of the invention to provide an optical system employing optically negative liquid crystalline compositions which may be adapted to be operative essentially independently of the presence of foreign stimuli.

It is a further object of the invention to provide an optical system which can be adapted to function as an optical filter system.

It is a still further object of the invention to provide an optical filter system which will permit transmission of one or more selected wavelength bands of incident radiation between and including the ultraviolet and infrared regions of the electromagnetic spectrum while substantially completely rejecting all other wavelengths within the incident radiation.

Another object of the invention is to provide an optical filter system which will permit transmission of substantially all wavelengths of incident radiation between and including the ultraviolet and infrared regions of the electromagnetic spectrum while simultaneously rejecting one or more wavelength bands within siad radiation.

A further object of the invention is to provide an optical system for providing circularly polarized light.

It is still another object of the invention to provide an optical system which can be adapted to function in an imaging mode.

It is a further object of the invention to provide an optical system which can be adapted to function as a light modulation system.

It is yet another object of the invention to provide an optical system which can be adapted to operate as a technique for monitoring levels of foreign stimuli.

Yet another object of the invention is to provide an optical system which can be adapted to function as an image converter for changing infrared image information to visible image information.

The above-mentioned objects and advantages and others are realized in accordance with the invention by employing compositions comprising optically negative liquid crystalline substances and additives of extrinsically optically inactive materials whose electronic transitions, i.e., effect obtained from the interaction of light energy with the electrons of the molecules, become circularly dichroic (i.e., show a large preferential absorption of either LHCPL or RHCPL) when introduced into an optically negative liquid crystalline environment. It should be understood that by the term "extrinsically optically inactive materials" we mean both intrinsically optically active and inactive materials which are optically active or inactive as single molecules in solution where intermolecular associations do not exist. Both intrinsically optically active molecules, which are dissymmetric as single molecules, and optically inactive molecules become extrinsically optically active when exposed to an optically negative liquid crystalline environment, This extrinsic induced behavior overwhelms and dominates over any intrinsic activity since the specific rotations and molecular ellipticities in the former case are substantially larger than that observed for single molecules in solution.

It has been found that when such extrinsically optically inactive materials are placed in the aforementioned environment, optical activity is induced in the optically inactive materials and they exhibit circularly dichroic behavior within their absorption bands. The optical behavior induced in the normally optically inactive materials is due to absorption whereas the circularly dichroic behavior of optically negative liquid crystalline substances is due to selective reflection of one type of circularly polarized light. The additive materials which acquire the induced optical activity, as opposed to the optically negative liquid crystalline substances, absorb both RHCPL and LHCPL, however they show a large preference for one type more than for the other type. Moreover the additive materials may also, in appropriate instances, affect the chirality of the host environment as will be discussed in detail hereinafter.

Thus such compositions may be utilized in imaging, optical filter and display applications among others, as will be more fully described below, and the devices can be tuned to the absorption band of the additive materials rather than the reflection band of the optically negative liquid crystalline substance; or various applications may make use of both the absorption band and the reflected band of the compositions.

The invention will be more fully understood from the following detailed description of various preferred embodiments thereof particularly when read in conjunction with the accompanying drawings wherein.

Figure 1:
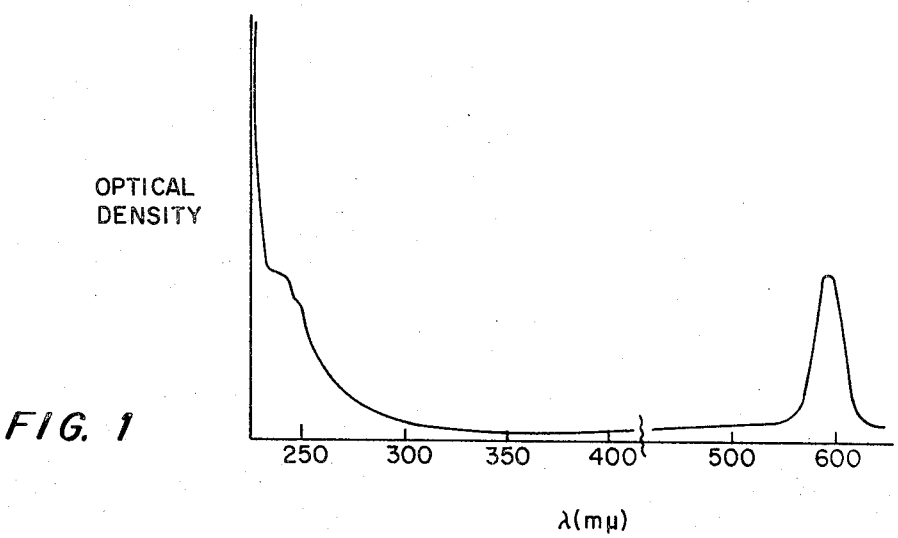
FIG. 1 shows the optical density of unpolarized light for a typical optically negative liquid crystalline composition.
Figure 2:
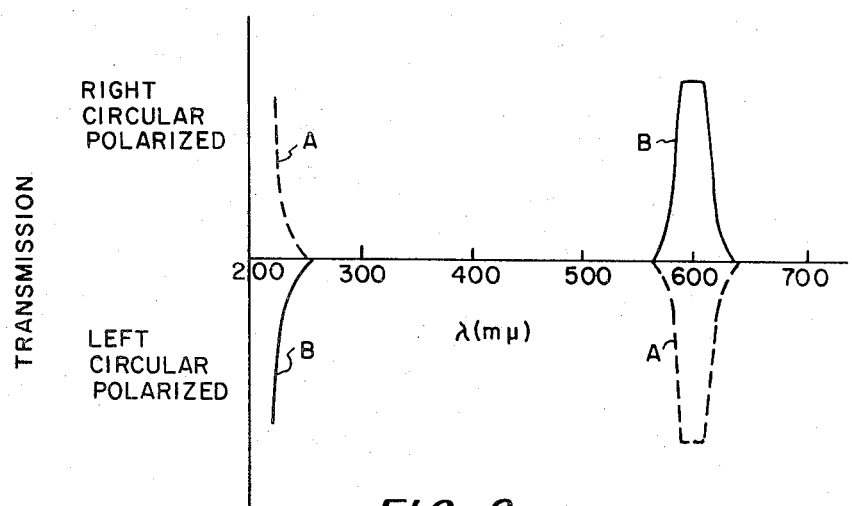
FIG. 2 is a graphical illustration of the transmission for LHCPL and RHCPL versus wavelength for the optically negative liquid crystalline compositions described in FIG. 1.

Referring now to FIG. 1 there is seen the optical density for a thin film (approximately 10 microns thick) of a 90.7%/9.3% by weight mixture of cholesteryl chloride and cholesteryl nonanoate. The mixture is a right-handed optically negative liquid crystalline composition. A 33.9%/66.1% by weight cholesteryl chloride/cholesteryl nonanoate mixture, which forms a left-handed optically negative liquid crystalline composition, has a similar absorption spectrum and thus the latter is not shown. FIG. 2 shows the optical density, for circularly polarized light, of the compositions described in FIG. 1 versus wavelength. Curve A represents the right-handed mixture while Curve B represents the left-handed mixture. It was known in the art that most cholesteric liquid crystalline substances absorb wavelengths of light in the far ultraviolet region of the electromagnetic spectrum. However it has now been surprisingly found that the absorption bands of optically negative liquid crystalline materials are circularly dichroic as is graphically illustrated in FIG. 2. Details concerning the preparation and testing of the compositions are given in Example I below.

Figure 3:
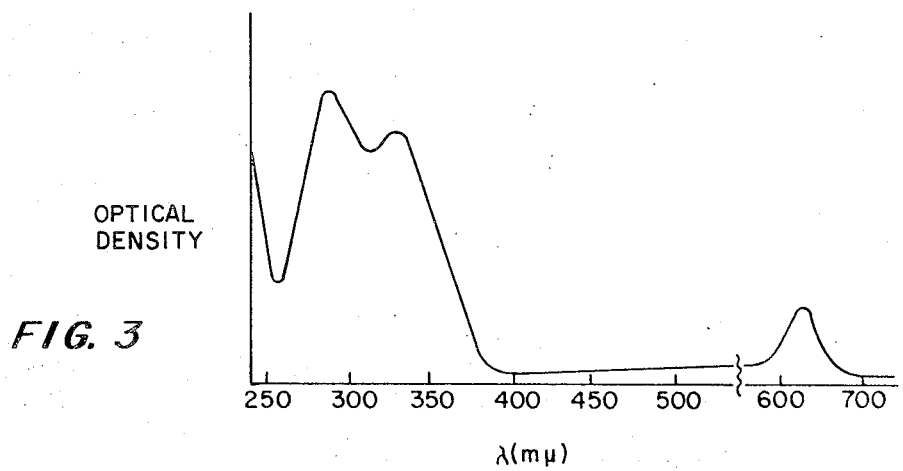
FIG. 3 shows optical density of unpolarized light for the optically negative liquid crystalline compositions described in FIG. 1 when 1 percent by weight of an optically inactive material has been added thereto.
Figure 4:
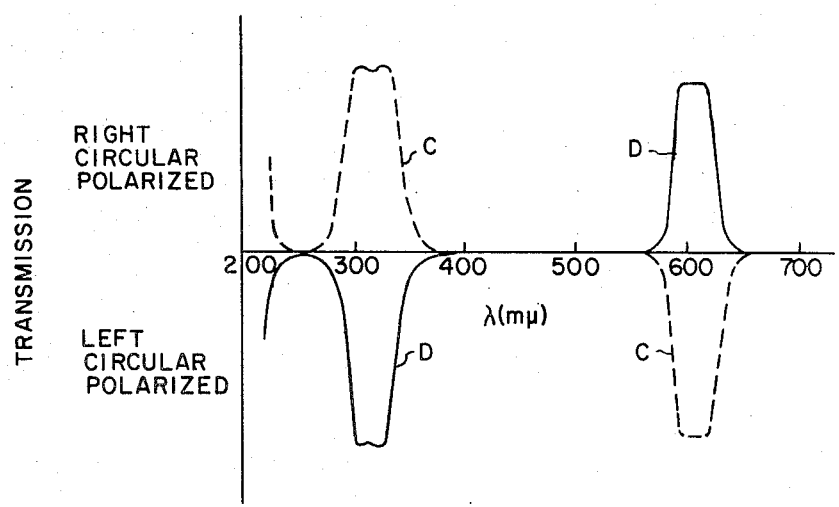
FIG. 4 is a graphical illustration of the transmission for LHCPL and RHCPL versus wavelength for the optically negative liquid crystalline compositions described in FIG. 3.

Referring now to FIG. 3 there is seen the optical density of a thin film of the 90.7%/9.3% cholesteryl chloride/cholesteryl nonanoate mixture to which 1 percent by weight of an optically inactive material, namely p-methoxybenzylidene-p-n-butylaniline has been added. Of course it will be recognized that the particular additive is typical of the optically inactive materials of the invention and is intended only to illustrate what effect is obtained; similar results can be obtained with any of the optically inactive materials encompassed by the invention. One percent of the anil additive is also added to the 33.9%/66.1% cholesteryl chloride/cholesteryl nonanoate mixture and a similar transmission spectrum (not shown) is obtained. FIG. 4 is a plot of the optical density of the compositions described in FIG. 3 versus wavelength. Curve C represents the right-handed mixture to which 1 percent of the anil additive has been added and Curve D the left-handed mixture to which 1 percent of the anil additive has been added. It can be clearly seen that the electronic transitions in the anil additive surprisingly become optically active in the optically negative liquid crystalline envirnment. Further it is apparent from FIG. 4 that the sign of the optical activity induced in the anil additive is dependent upon the chirality, i.e., the handedness of the helical structure, of the environment into which the optical inactive material is incorporated. Details concerning the preparation and testing of the compositions are given in Example II below.

It has been further found through extensive experimentation that the induced circular dichroism is always opposite to the circular dichroic activity of the pitch band of the optically negative liquid crystalline material which is due to selective reflection as has been previously described. Thus if the optically negative liquid crystalline environment is right-handed, the additive will have a circular dichroic band whose sign is effectively that of a left-handed material when it is mixed with the optically negative liquid crystalline substance even though the additive has no inherent helical structure.

Experimental results also indicate that the intensity of the induced circularly dichroic absorption band is directly proportional to the pitch of the cholesteric mesophase, e.g., a larger pitch results in increased intensity for the absorption band, etc. However it is significant to note that a decrease in the intensity of the induced circularly dichroic band has been observed when the texture of the host cholesteric liquid crystalline environment is converted from the Grandjean to the focal-conic by means of an electric field.

The additive can also, if it has a suitable molecular structure arrangement, react on and influence the pitch band of the optically negative liquid crystalline material. Potentially asymmetrical molecules which do not show a preference for forming left or right-handed helices in an archiral environment can, when incorporated into the optically negative liquid crystalline environment, influence the helical arrangement as well as being influenced by it as has been described. The influence on the helical arrangement of the optically negative liquid crystalline material is such as to change the $\lambda_o$ value thereof.

Figure 5:
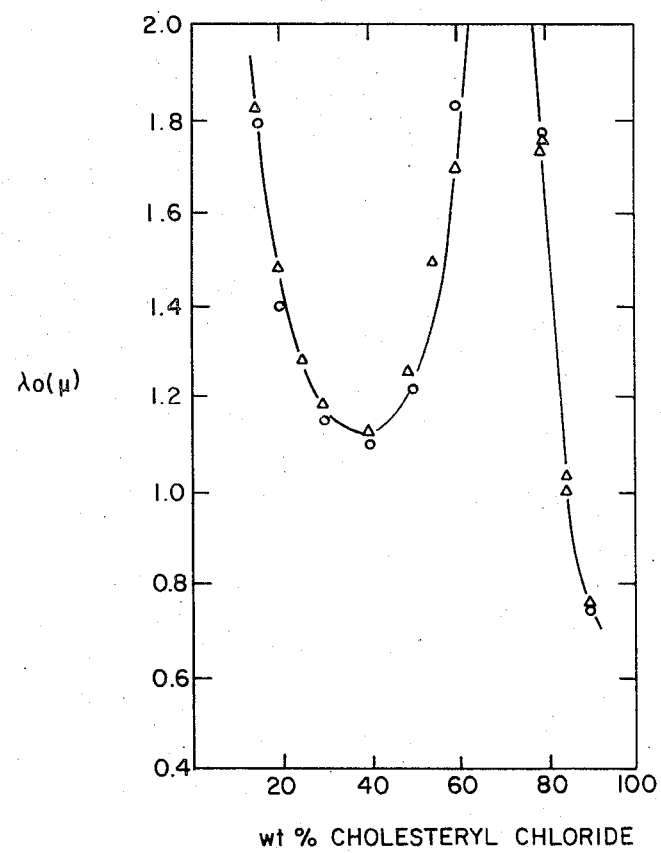
FIG. 5 is a graphical illustration showing $\lambda_o$ versus composition in weight per cent for mixtures of a typical optically negative liquid crystalline substance and a typical extrinsically optically inactive material.

This phenomenon is illustrated graphically in FIG. 5 which shows a plot of $\lambda_o$ versus weight percent of cholesteryl chloride, a right-handed optically negative liquid crystalline substance, in mixtures of cholesteryl chloride with p-methoxybenzylidene-p-n-butylaniline at 23°C. The inversion wavelength for the system is seen to have a compositional dependence which is similar to that found in mixtures of bonafide left-handed optically negative liquid crystalline substances with cholesteryl chloride. The values of optical rotation observed for the 40 percent cholesteryl chloride/60 percent anil additive in the vicinity of the absorption band of the anil additive are large at 24°C, being 70° at 549mµ for a sample thickness of 21 microns. The optical rotation at a given wavelength is measured by determining how much linearly polarized light is rotated when it is passed through the material such as by viewing the transmitted light through a polarizing microscope. Further the optical rotation is opposite in sign to that which would be expected if the anil additive has not modified the optical properties of the mixture. The sign of the optical activity is determined by the handedness of the circularly polarized light reflected at $\lambda_o$ by the optically negative liquid crystalline material when it is in the Grandjean texture as was discussed previously.

An important advantage derived from exploiting the induced circular dichroic optical activity of the absorption band of the additives is that the absorption band will always remain substantially in the same osition and will not be shifted to any significant extent by the presence of foreign stimuli. The magnitude of the optically active effect will typically change when a foreign stimulus acts upon the composition but the position of the band will not. This behavior is opposite to that of the pitch band of the optically negative liquid crystalline composition when acted upon by a foreign stimulus since, as is appreciated by those skilled in the art, the location of the pitch band changes but the amplitude thereof is always substantially the same. For example when a stimulus acts upon the optically negative liquid crystalline environment the pitch may become larger causing $\lambda_o$ to become larger (since $\lambda_o = 2np$). The induced circular dichroism increases initially but must then decrease, eventually reaching zero when the optically negative liquid crystalline environment is destroyed and becomes nematic in character. The absorption band will remain of course but the induced optical activity would no longer be present. Of course the opposite is also true.

Thus it can be seen that the addition of extrinsically optically inactive materials whose absorption bands become highly optically active when introduced into an optically negative liquid crystalline environment permits a novel and highly advantageous means for tailoring the properties of optically negative liquid crystal systems to achieve novel and extremely useful results. The above-mentioned additives can be used to provide a circularly dichroic absorption band for the composition as well as to affect the handedness, i.e. the circular sense, of the helical structure of the optically negative liquid crystalline environment.

The additives which can be incorporated with optically negative liquid crystalline substances according to the invention should be at least partially soluble in such a liquid crystalline environment and should have electronic transitions which become circularly dichroic in some region of the electromagnetic spectrum. Any suitable extrinsically optically inactive material can be used according to the invention. Typical suitable extrinsically optically inactive materials include, among others, organic dyes, aromatic compounds such as benzene, naphthalene, anthracene and the like; azo compounds such as arylazonaphthols, azobenzenes, etc.; nitro compounds such as nitrobenzene, nitroarylazonaphthols and the like; nitroso compounds such as nitrosobenzenes, nitrosonaphthalene and the like; anil compounds such as benzylidene aniline, etc.; carbonyl compounds such as acetone, acetophenone, benzophenone and the like; thiocarbonyls such as thioacetophenones, thioacetone, thiobenzophenone and the like; alkenes such as butadiene, cyclohexene, etc.; heterocyclics such as furans, aziridines, pyridenes and the like; alkanes such as hexane, dodecane and the like; and mixtures thereof.

Generally speaking it is preferred to use colored extrinsically optically inactive additive materials such as, for example, organic dyes in the novel compositions of the invention since the colored additives will provide preferred results when the compositions are utilized in various modes of application as will be discussed in detail hereinafter. For example, in a preferred embodiment of the invention where the compositions of the invention are employed in an imaging mode the use of colored additive materials will permit direct visible read-out of an image where the optical input is not in the visible spectral region of the electromagnetic spectrum.

Of course it should be recognized that the above classes of materials are intended to be illustrative only of the additives which will produce the previously described induced behavior since every compound containing at least one chromophore, i.e. a light-absorbing center, within the molecule will exhibit the induced behavior providing it is soluble to some extent in the optically negative liquid crystalline environment. However it should also be recognized that not all of the additive materials will show a helical preference and thus affect the handedness of the helical structure of the host environment in the manner illustrated by the materials used in FIG. 5.

A molecule is intrinsically optically active when its mirror image is not superimposable on itself, that is to say that it has no reflection symmetry. However there are many molecules which are potentially dissymmetric provided that internal rotation is hindered about single bonds as is the case for a conformation of N-(p-methoxybenzylidene)-p-butylaniline. However in solution at room temperature there is no hindered rotation and conformers with reflection symmetry are also present resulting in optical inactivity. In molecules such as benzene and naphthalene which always possess reflection symmetry the opportunity for intrinsic optical activity does not exist. Thus materials such as N-(p-methoxybenzylidene)-p-butylaniline will show a helical preference when exposed to an optically negative liquid crystalline mesophase due to restricted rotation about the single bonds in the molecule whereas compounds such as benzene and naphthalane should have little or no effect upon the pitch band of liquid crysal materials since these symmetrical compounds can not derermine the difference between left and right-handed helical structures.

The amount of the additives which can be incorporated into an optically negative liquid crystalline environment can vary over an extremely wide range. The amount added in any particular instance is dependent primarily upon the intended use of the particular composition. For example where it is intended to exploit the induced optical activity of the absorption band of the additive as little as $10^{-7}$ molar solutions of optically inactive material can provide the inducted optical activity; generally a relatively low concentration of additive, e.g. up to about 10 percent by weight will be used for this purpose. When it is desired to affect the spiral sense of the liquid crystalline environment then up to about 99 percent by weight of additive could be used. Of course the upper limit of the amount of additive which can be incorporated into any particular optically negative liquid crystal composition is controlled by the requirement that the total environment must retain its optically negative liquid crystalline character after the addition of the optically inactive material.

With respect to the amount of any particular optically inactive material which can be used it is significant to note that those which are not liquid crystalline themselves, i.e. are not smectic or nematic liquid crystalline substances, generally have a tendency to destroy the liquid crystalline properties of the optically negative liquid crystalline environment and thus can be added in amounts up to about 50 percent by weight. Optically inactive liquid crystalline substances, i.e. smectic or nematic liquid crystalline materials, can be added in amounts up to about 99 percent by weight.

Any suitable cholesteric liquid crystal substance, mixtures thereof or compositions having liquid crystalline characteristics may be employed in the novel compositions of the invention. Typical suitable cholesteric liquid crystals include derivatives from reactions of cholesterol and inorganic acids, for example: cholesteryl chloride, cholesteryl bromide, cholesteryl iodide, cholesteryl fluoride, cholesteryl nitrate; esters derived from reactions of cholesterol and carboxylic acids; for example, cholesteryl crotonate; cholesteryl nonanoate, cholesteryl hexanoate; colesteryl formate; cholesteryl docosonoate; cholesteryl propionate; cholesteryl acetate; cholesteryl valerate; cholesteryl vacconate; cholesteryl linolate; cholesteryl linolenate; cholesteryl oleate; cholesteryl erucate; cholesteryl butyrate; cholesteryl caproate; cholesteryl laurate; cholesteryl myristate; cholesteryl clupanodonate; ethers of cholesterol such as cholesteryl decyl ether; cholesteryl lauryl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate; cholesteryl-p-nonylphenyl carbonate; cholesteryl-2-(2-ethoxyethoxy) ethyl carbonate; cholesteryl-2-(2-butoxyethoxy) ethyl carbonate; cholesteryl-1-2-(2-methoxyethoxy) ethyl carbonate; cholesteryl geranyl carbonate; cholesteryl heptyl carbamate; and alkyl amides and aliphatic secondary amines derived from $3\beta$-amino $\Delta$ 5-cholestene and mixtures thereof; peptides such as poly-$\gamma$-benzyl-$l$-glutamate; derivatives of beta sitosterol such as sitosteryl chloride; and amyl ester of cyano benzilidene amino cinnamate. The alkyl groups in said compounds are typically saturated or unsaturated fatty acids, or alcohols, having less than about 25 carbon atoms, and unsaturated chains of less than about five double-bonded olefinic groups. Aryl groups in the above compounds typically comprise simply substituted benzene ring compounds. Any of the above compounds and mixtures thereof may be suitable for cholesteric liquid crystalline materials in the advantageous system of the present invention.

Mixtures of liquid crystals can be prepared in organic solvents such as chloroform, petroleum ether and others, which are typically evaporated from the mixture leaving the liquid crystal composition. Alternatively, the individual components of the liquid crystalline mixture can be combined directly by heating the mixed components above the isotropic transition temperature.

The above lists of typical suitable optically negative liquid crystalline substances are intended to encompasse mixtures of the above. These lists are intended to be representative only and are not to be construed as being exhaustive or limiting the invention to the specific materials mentioned. Although any liquid crystalline composition having cholesteric liquid crystalline characteristics is suitable for use in the present invention, it should be recognized that various different cholesteric liquid crystal substances or mixtures thereof or combinations of cholesteric liquid crystal substances with other substances such as those mentioned above will only possess the necessary properties which make them suitable for use according to the invention at some specific temperature range which may be at room temperature or substantially below or above room temperature. However, all of the various substances, mixtures or combinations thereof will function according to the method at some temperature. Typically, the materials of the invention will be used at or near room temperature. Thus, it is preferred to employ liquid crystal substances which have a liquid crystal state at or near room temperature. Generally speaking, the liquid crystal substance will preferably be in the liquid crystal state at the desired operational temperature.

The optical systems prepared according to the invention may be utilized for a great number of applications. According to a preferred embodiment of the invention the optically negative crystalline compositions hereinbefore described may be utilized in an optical filter system.

One well-known common type of optical filter is the band pass filter which, generally speaking, is utilized for passing radiation of selected wavelengths while simultaneously rejecting undesired wavelengths. Such an optical filter system utilizing one or more optically negative liquid crystalline films arranged between a linear polarizer member and a linear analyzer member is disclosed in copending patent application Ser. No. 104,367, filed Jan. 6, 1971 now U.S. Pat. No. 3,669,525 and hereby incorporated by reference herein. When light is directed upon such a device at normal incidence and the axes of polarization of the linear polarizer and linear analyzer are positioned at an angle of 90° to each other the emergent beam transmitted by the device is made up of one or more spectral bands, each respective band centered about the $\lambda_o$ value of each respective liquid crystal film. Any number of liquid crystal films, each having a different $\lambda_o$ value may be arranged between the linear polarizer and linear analyzer. According to the present invention any number of liquid crystal films comprising optically negative liquid crystalline substances to which an extrinsically optically inactive material has been added, can be arranged between a linear polarizer and linear analyzer; or preferably a single film of an optically negative liquid crystalline composition itself containing any number of extrinsically optically inactive additive materials may be utilized. Devices constructed in this manner will transmit a spectral band which coincides with the induced circularly dichroic absorption band of each different additive material as well as a spectral band centered about the $80_o$ value of each different liquid crystal substance. Thus in a particularly preferred embodiment a composition exhibiting a plurality of different induced circularly dichroic absorption bands, e.g., three, which could be selected to span the visible spectrum and having a pitch band outside the visible region is formed. When employed as described above with white light such as a composition can provide a three-color light source suitable for color imaging systems such as color xerography, photoelectrophoretic color imaging which is described in detail in U.S. Pat. Nos. 3,384,565; 3,384,566; 3,383,993, and 3,384,488 or for use in color display systems. Devices arranged to function as described above have the important advantage that the transmitted beam is essentially independent of the presence of various foreign stimuli to which the pitch band of the optically negative liquid crystalline substance is sensitive. In other words the position of the transmitted bands does not change to any substantial extent as the levels of foreign stimuli present vary although the amplitude of the transmitted band will vary as has been described in detail above. Of course it may be desired in certain instances to utilize the transmitted pitch band as well as the transmitted induced circularly dichroic absorption bands of any particular composition or compositions.

Another type of optical filter is one which is capable of transmitting light at substantially all wavelengths of incident radiation while simultaneously reflecting a wavelength band or bands within the incident radiation. Such an optical filter system which employs optically negative liquid crystalline substances is described in detail in copending patent application Ser. No. 104,369, filed Jan. 6, 1971 now U.S. Pat. No. 3,679,290 and hereby incorporated by reference herein. Generally speaking, such optical filters comprise one or more matched pairs of complementary liquid crystal films, each complementary matched pair having two liquid crystal films having the same $\lambda_o$ values but which are opposite in intrinsic screw sense. One or more extrinsically optically inactive additive materials can be added to each film of a complementary matched pair thus enabling the removal of an undesired wavelength band which coincides with the induced circularly dichroic absorption band of each additive. Similarly to the possibilities described with respect to the band pass filter embodiment of the invention, the pitch band of the host liquid crystalline environment may be made use of as well as the induced circularly dichroic absorption bands. Of course it should be recognized that the absorption bands, as well as the pitch bands, may lie in any region of the electromagnetic spectrum which is of interest when the compositions are used in optical filter systems.

The optical system of the invention maybe adapted to function as an advantageous color display system. Display systems which involve a phase transformation from the optically negative cholesteric liquid crystalline mesophase to the nematic mesophase in response to an applied potential are described, for example, in copending patent application Ser. No. 821,565, filed May 5, 1969 now U.S. Pat. No. 3,652,148 and hereby incorporated by reference herein. Cholesteric liquid cyrstalline substances in the cholesteric state are typically translucent, for example, like a milky white opalescent layer when initially placed between a sandwich formed by two unbiased electrodes. When a high electric field is placed across the liquid crystal film, the field-induced phase change is observable because the liquid crystal film becomes transparent in areas where the field is present. When viewed between polariziers with transmitted light the areas in which the field-induced phase change has taken place appears dark while the unchanged, translucent, light-scattering and birefringent cholesteric mesophase areas still retain their translucent appearance. According to the present invention it is possible to form a composition comprising a cholesteric liquid crystal having a $\lambda_o$ in the infra red region and an optically inactive material whose absorption band lies in the visible region. Cholesteric liquid crystalline systems whose $\lambda_o$ values are in the infrared region require relatively low threshold voltages to transform them from the cholesteric to the nematic mesophase. Thus in this manner an advantageous color display system can be provided which requires only relatively low threshold voltages to be operative.

optical ptical system of the invention may also be employed as a means for monitoring the presence of, and /or the level of, varous foreign stimuli. The induced circularly dichroic absorption band of a composition made according to the invention can be monitored and used to provide a control signal to maintain a certain temperature level, for example, or to change it in some prescribed manner.

According to another embodiment of the invention a film of an optically negative liquid crystalline composition can be arranged between a linear polarizer and a linear analyzer element and utilized as an image converter. For example, consider a composition which has a $\lambda_o$ value in the infra-red region and an induced circularly dichroic absorption band in the visible. As was discussed above, the position of the induced band will not change in response to some stimulus, but the amplitude will. If imagewise infra-red light is directed upon the device to modify $\lambda_o$, then the value of the activity in the induced band will change and there will be corresponding changes in the transmitted light. Thus the device is capable of converting an infra-red image to a visible image.

The invention will now be described further in detail with respect to specific preferred embodiments by way of examples it being understood that these are intended to be illustrative only and the invention is not limited to the conditions, materials, procedures, etc. recited therein. All parts and percentages listed are by weight unless otherwise specified.

EXAMPLE I

An optically negative liquid crystalline composition is prepared by mixing together about 90.7 percent cholesteryl chloride and about 9.3 percent cholesteryl nonanoate. An approximately 10 micron thick film of this composition, which has a left-handed helical structure, is placed between a pair of approximately ⅛ × 1 inch quartz discs. These are placed in a Cary 15 Spectrometer and the transmission spectrum of the composition is recorded. The transmission spectrum is shown in FIG. 1. A composition containing about 33.9 percent of cholesteryl chloride and about 66.1 percent of cholesteryl nonanoate and having a right-handed helical structure is also prepared and tested as described above. A similar transmission spectrum to that shown in FIG. 1 is obtained for the latter composition.

Films of the respective compositions between quartz discs are then placed in a Cary 60 Spectropolarimeter and their transmission of left and right circularly polarized light versus wavelength is measured. The results obtained are shown in the plot of FIG. 2.

EXAMPLE II

An optically negative liquid crystalline composition is prepared by mixing together 1 percent of p-methoxybenzylidene-p-n-butylaniline (MBBA) and 99 percent of a 90.7%/9.3% mixture of cholesteryl chloride/cholesteryl nonanoate. The transmission spectrum of the composition is obtained in the manner described in Example I. The transmission spectrum of the composition is shown in FIG. 3.

A composition containing 1 percent MBBA and 99 percent of 33.9%/66.1% mixture of cholesteryl chloride/cholesteryl nonanoate is also prepared and tested in a similar manner. The transmission spectrum of the latter composition is similar to that shown in FIG. 3.

Films of the respective compositions between quartz discs are placed in a Cary 60 Spectropolarimeter and their transmission of left and right circularly polarized light versus wavelength is measured. The results obtained are shown in the plot of FIG. 4.

EXAMPLE III

A composition made up of 2 percent of 4-methoxy-1-phenylazonaphthalene and 98 percent of a 60%/40% mixture of cholesteryl chloride/cholesteryl nonanoate is prepared. The composition is placed in an electric cell comprising two ⅛ ×1 inch optically transparent conductive tin oxide-coated quartz plates (made by subliming an optically transparent conductive tin oxide layer onto the quartz plates) separated by a 1 mil thick Mylar spacer. The cell is then placed in a Cary 60 Spectropolarimeter in the circular dichroism mode. A large negative induced circularly dichroic band (cotton effect) is observed at 390m$\mu$ for the azo compound incorporated in the optically active cholesteric liquid crystalline mesophase.

An electric field of about 200 volts/mil is placed across the transparent electrodes and the induced optical activity is no longer observed. The electric field causes the cholesteric mesophase to be converted to the nematic mesophase. The electric field is removed from the electrodes and the induced circularly dichroic band reappears.

EXAMPLE IV

An optically negative liquid crystalline composition is formed by mixing together about 60 percent MBBA and about 40 percent cholesteryl chloride. At 25°C the composition has a pitch band centered at about 1.8$\mu$ and an absorption band centered at about 325m$\mu$. A film of the composition is placed between parallel glass supports separated by a 1 mil thick Mylar spacer. This combination is placed in a polarizing microscope and the absorption band is observed to have induced circularly dichroic activity. At 21°C the optical activity in the induced band is about 112° at 489m$\mu$.

The temperature of the liquid crystal film is then reduced to about −5°C. The pitch band is observed to move to about 750m$\mu$. The absorption band is observed to remain at about 325m$\mu$ however the optical activity becomes about 185°.

Thus a thermal change is converted into a change in the activity of the absorption band and a change in location in the pitch band.

The liquid crystal film can be arranged between a linear polarizer and a linear analyzer to provide a device which is capable of functioning as an image converter.

EXAMPLE V

An optically negative liquid crystalline composition is formed by mixing together about 1 percent MBBA and about 99 percent of a 90.7 percent cholesteryl chloride-9.3 percent cholesteryl nonanoate mixture. A film of the composition is placed between quartz plates separated by a ½ mil Mylar spacer. This combination is placed in a Cary 60 Spectropolarimeter in the circularly dichroic mode.

At 25°C the pitch band is observed at about 600m$\mu$ and preferentially transmits left-hand circularly polarized light. The induced circularly dichroic absorption band, located at about 325m$\mu$, preferentially transmits right-hand circularly polarized light.

The device may be used as a filter to reduce both 600 m$\mu$ and 325m$\mu$ components from an incident unpolarized light beam. Further reduction can be achieved by using appropriate circular polarizers on the output of the device.

EXAMPLE VI

An optically negative liquid crystalline composition is formed by mixing together about 1 percent MBBA and about 99 percent of a 33.9 percent cholesteryl chloride-66.1 percent cholesteryl nonanoate mixture. A film of the composition is placed between quartz plates separated by a 1 mil Mylar spacer. The combination is placed in a Cary 60 Spectropolarimeter in the circularly dichroic mode.

At 25°C the pitch band is observed at about 600m$\mu$ and preferentially transmits right-hand circularly polarized light. The induced circularly dichroic absorption band, located at about 325m$\mu$ preferentially transmits left-hand circularly polarized light.

The device can be used to generate circularly polarized light at both 600m$\mu$ and 325m$\mu$, with each respective transmitted band being circularly polarized in the opposite sense from that of the other.

EXAMPLE VII

An optically negative composition is formed by mixing together 52.5 mg MBBA and 10 grams of a 27.7%/72.3% mixture of cholesteryl chloride/cholesteryl nonanoate (a left-handed cholesteric mixture). An approximately 6.3 $\mu$ thick film of the composition is placed between quartz discs.

Another composition is prepared by mixing together 63.9mg MBBA and 10 grams of a 90.6%/9.4% mixture of cholesteryl chloride/cholesteryl nonanoate (a right-handed cholesteric mixture). An approximately 11.7$\mu$ thick film of this composition is placed between quartz discs.

Figure 6A:
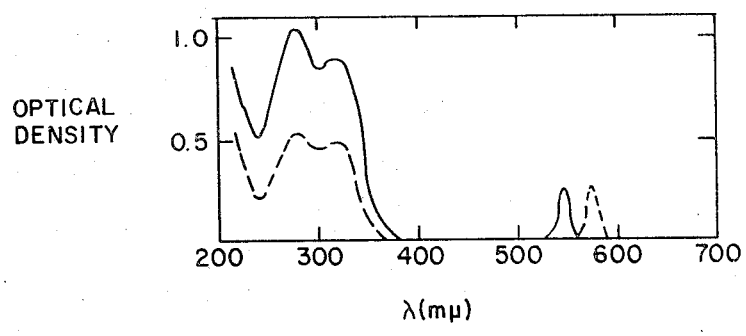
FIG. 6A shows the optical density of unpolarized light for a composition formed according to the invention.

The respective transmission spectra of these compositions are recorded in a Cary 15 Spectrometer. These are shown in FIG. 6A with the broken line corresponding to the former composition and the solid line corresponding to the latter.

Figure 6B:
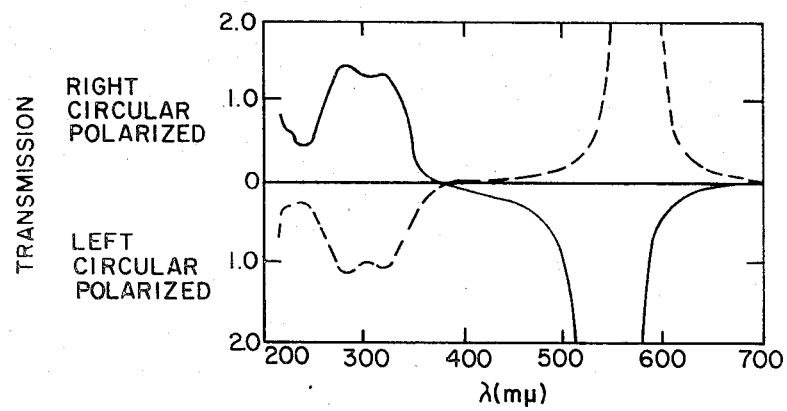
FIG. 6B is a graphical illustration of the transmission for LHCPL and RHCPL versus wavelength for the same composition described in FIG. 6A.

The transmission of left and right circularly polarized light versus wavelength for the compositions is also measured using the Cary 60 Spectropolarimeter. These spectra are shown in FIG. 6B with the solid and broken lines corresponding to the same compositions as described above.

EXAMPLE VIII

An optically negative liquid crystalline composition is formed by mixing together about 90 percent cholesteryl chloride and about 10 percent MBBA. A film of this composition is placed between glass plates separated by a 1 mil Mylar spacer. The film is placed in a polarizing microscope and is observed to be right-handed. Surprisingly it is found that the $\lambda_o$ value of the compositon is about 750m$\mu$ at 23°C whereas the $\lambda_o$ value of the cholesteryl chloride is about 480°.

A composition having about 80 percent cholesteryl chloride and about 20 percent MBBA is also formed and observed as above. The composition is left-handed and has a $\lambda_o$ value of about 1.45$\mu$ at 23°C. Thus it is seen that the extrinsically optically inactive additive can affect the location of the pitch band of the optically negative liquid crystalline substance as well as affecting the chirality thereof.

EXAMPLES IX–XIV

In these examples the compositions described are arranged between two ⅛ × 1 inch quartz discs, as thin films approximately 5 to 20 µ thick, in the supercooled liquid crystalline state. The films are tested by placing them in a Cary 60 Spectropolarimeter in the circular dichroism mode. The instrument has a spectral range of from 200mµ to 700mµ.

EXAMPLE IX

An optically negative composition is formed by mixing together about 2 percent azobenzene and about 98 percent of a 60%/40% mixture of cholesteryl chloride/cholesteryl nonanoate (a left-handed mixture). A large negative induced circularly dichroic band at 320mµ for azobenzene is observed indicating a greater absorption of RHCPL than of LHCPL for the absorption band.

Another optically negative composition is formed by mixing together about 2 percent azobenzene and 98 percent of a 91%/9% mixture of cholesteryl chloride/cholesteryl nonanoate (a right-handed cholesteric mixture). A positive induced circularly dichroic band is observed at 320mµ indicating a greater molar absorptivity for LHCPL than for RHCPL. A device employing these films may be used as a filter to reduce the 320mµ composition from an incident unpolarized light beam. Further reduction can be achieved by utilizing appropriate circular polarizers on the output from the device.

EXAMPLE X

An optically negative composition is prepared by mixing together about 2 percent p-chloroacetophenone and about 98 percent of a 60%/40% mixture of cholesteryl chloride/cholesteryl nonanoate. Large negative induced circular dichroism bands for p-cloroacetophenone at 230, 268, and 309mµ are observed indicating a greater absorption of RHCPL than of LHCPL.

Another composition is prepared by mixing together about 2 percent p-chloroacetophenone and about 98 percent of a 91%/9% cholesteryl chloride/cholesteryl nonanoate mixture. Positive induced circularly dichroic bands are observed at 230, 268 and 309mµ indicating a molar absorptivity for LHCPL greater than that for RHCPL. A device utilizing these films may be used as a filter to reduce the 230, 268 and 309mµ components from an incident unpolarized light beam. Further reduction can be achieved by utilizing appropriate circular polarizers on the output of the device.

EXAMPLE XI

An optically negative composition is prepared by mixing together about 2 percent of m-chloroacetophenone and about 98 percent of a 60%/40% mixture of cholesteryl chloride/cholesteryl nonanoate. Large negative induced circular dichroism bands at 240, 252 and 285 mµ for m-chloroacetophenone are observed indicating a greater absorption of RHCPL than of LHCPL.

Another composition is formed by mixing together about 2 percent m-chloroacetophenone and about 98 percent of a 91%/9% mixture of cholesteryl chloride/cholesteryl nonanoate. Positive induced circular dichroism bands at 240, 252 and 285mµ for m-chloroacetophenone are observed indicating a molar absorptivity for LHCPL greater than that for RHCPL. A device utilizing these films can be used as a filter to reduce the 240, 252 and 285mµ components from an incident unpolarized light beam. Further reduction can be achieved by utilizing appropriate circular polarizers on the output of the device.

EXAMPLE XII

An optically negative composition is prepared by mixing together about 2 percent o-chloroacetophenone and about 98 percent of a 60%/40% mixture of cholesteryl chloride/cholesteryl nonanoate. Large negative induced circular dichroism bands at 233, 255 and 290 for o-chloroacetophenone are observed indicating a greater absorption of RHCPL than of LHCPL.

Another composition is prepared by mixing together about 2 percent of o-chloroacetophenone and about 98 percent of a 91%/9% mixture of cholesteryl chloride/cholesteryl nonanoate. Positive induced circular dichroism bands at 233, 255 and 290mµ are observed indicating a molar absorptivity for LHCPL larger than that for RHCPL. A device utilizing these films may be used as a filter to reduce the 233, 255 and 290mµ components from an incident unpolarized light beam. Further reduction can be achieved by utilizing appropriate circular polarizers on the output of the device.

EXAMPLE XIII

An optically negative composition is formed by mixing together about 2 percent o-methoxyacetophenone and about 98 percent of a 60%/40% mixture of cholesteryl chloride/cholesteryl nonanoate. Large negative induced circular dichroism bands at 245 and 300mµ for o-methoxyacetophenone are observed indicating a greater absorption of RHCPL than of LHCPL.

Another composition is formed by mixing together about 2 percent o-methoxyacetophenone and about 98 percent of a 91%/9% mixture of cholesteryl chloride/cholesteryl nonanoate. Positive induced circular dichroism bands at 245 and 300mµ are observed indicating a molar absorptivity for LHCPL greater than that for RHCPL. A device utilizing these films can be used as a filter to reduce the 245 and 300mµ components for an incident unpolarized light beam. Further reduction can be achieved by using appropriate circular polarizers on the output of the device.

EXAMPLE XIV

An optically negative composition is prepared by mixing together about 2 percent m-methoxyacetophenone and about 98 percent of a 60%/40% mixture of cholesteryl chloride/cholesteryl nonanoate. Large negative induced circular dichroism bands at 246 and 305mµ for m-methoxyacetophenone are observed indicating a greater absorption of RHCPL than of LHCPL.

Another composition is formed by mixing together about 2 percent m-methoxyacetophenone and about 98 percent of a 91%/9% mixture of cholesteryl chloride/cholesteryl nonanoate. Positive induced circular dichroism bands are observed at 246 and 305mµ indicating a molar absorptivity for LHCPL larger than that for RHCPL. A device utilizing these films may be used as a filter to reduce the 246 and 305mµ components from an incident unpolarized light beam. Further reduction can be achieved by using appropriate circular polarizers on the output of the device.

While the invention has been described in detail with respect to various preferred embodiments thereof it is not intended to be limited thereto but rather it will be appreciated by those skilled in the art that modifications and variations are possible which are within the spirit of the invention and the scope of the claims.

What is claimed is:

1. A method for transmitting desired wavelengths of incident radiation while substantially completely rejecting all other wavelengths of the incident radiation comprising:
   a. providing a light source;
   b. providing an optical filter comprising a linear polarizer member, a linear analyzer member and at least one film of an optically negative liquie crystal composition positioned between said linear polarizer and said linear analyzer, said liquid crystal composition comprising an optically negative liquid crystalline material having a reflection band with center wavelength $\mu_o$ and exhibiting reflective circularly dichroic behavior and at least one extrinsically optically inactive additive material having a light absorption band outside said reflection band and defining a region of interest; and
   c. directing a beam of radiation from said light source upon said optical filter thereby providing an emergent light beam containing a wavelength band corresponding to the absorption band of said extrinsically optically inactive material, wherein said linear analyzer is adapted to transmit said wavelengths within said absorption band.

2. The method as defined in claim 1 wherein the angular relationship of the axes of polarization of said linear polarizer and said linear analyzer is about 90°.

3. The method as defined in claim 1 wherein said liquid crystal film is from about 0.5 to about 50 microns in thickness.

4. The method as defined in claim 1 wherein said light absorption band of at least one said extrinsically optically inactive material is in the visible region of the electromagnetic spectrum.

5. The method as defined in claim 1 wherein the extrinsically optically inactive additive material content of said liquid crystal film comprises up to about 60 percent by weight.

6. The method as defined in claim 1 wherein the extrinsically optically inactive additive material comprises a member selected from the group consisting of: aromatic compounds; azo compounds; nitro compounds; nitroso compounds; anil compounds; carbonyl compounds; thiocarbonyl compounds; alkenes; heterocyclic compounds; alkanes; and mixtures thereof.

7. The method as defined in claim 1 wherein the extrinsically optically inactive additive material content of said liquid crystal film comprises up to about 99 percent by weight.

8. The method as defined in claim 7 wherein said extrinsically optically inactive additive material comprises a member selected from the group consisting of smectic liquid crystalline substances, nematic liquid crystalline substances and mixtures thereof.

* * * * *